United States Patent
Mirzazad Barijough et al.

(10) Patent No.: US 10,796,284 B2
(45) Date of Patent: Oct. 6, 2020

(54) COLLABORATIVE SCHEDULING

(71) Applicant: FUJITSU LIMITED, Kawasaki-shi, Kanagawa (JP)

(72) Inventors: Sanam Mirzazad Barijough, San Francisco, CA (US); Ramya Malur Srinivasan, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 340 days.

(21) Appl. No.: 15/271,032

(22) Filed: Sep. 20, 2016

(65) Prior Publication Data

US 2018/0082259 A1    Mar. 22, 2018

(51) Int. Cl.
G06Q 10/10    (2012.01)
G06Q 10/06    (2012.01)

(52) U.S. Cl.
CPC .  *G06Q 10/1093* (2013.01); *G06Q 10/063116* (2013.01)

(58) Field of Classification Search
CPC ................................. G06F 3/00; G06Q 99/00
USPC ................................................ 705/7.11–7.42
See application file for complete search history.

(56) References Cited

U.S. PATENT DOCUMENTS

| | | |
|---|---|---|
| 6,370,566 B2 | 4/2002 | Discolo et al. |
| 8,121,953 B1 | 2/2012 | Orttung et al. |
| 8,753,514 B2 | 6/2014 | Jones et al. |
| 8,863,293 B2 | 10/2014 | Christodorescu et al. |
| 2005/0216324 A1* | 9/2005 | Maithell .......... G06Q 10/06375 705/7.22 |
| 2011/0066468 A1* | 3/2011 | Huang ................. G01C 21/362 705/7.19 |

(Continued)

FOREIGN PATENT DOCUMENTS

| | | | | |
|---|---|---|---|---|
| EP | 1368741 A2 | * | 12/2003 | ........ H04M 3/42229 |
| WO | 2015040508 A1 | | 3/2015 | |

OTHER PUBLICATIONS

Cho, J., Swami, A., & Chen, I. (2010). Modeling and Analysis of Trust Management Protocols: Altruism versus Selfishness in MANETs. U.S. Army Research Laboratory Computational and Information Sciences Directorate, 141-156.*

(Continued)

*Primary Examiner* — Alan S Miller
*Assistant Examiner* — Jay-Ming Wang
(74) *Attorney, Agent, or Firm* — Maschoff Brennan

(57) ABSTRACT

A method of collaborative scheduling includes receiving group inputs and receiving environmental data. The method includes calculating collaborative schedule information based on the environmental data, traits, and the group inputs that include feasible schedules and total schedule costs associated therewith that are based on an individual member performance cost, a flexible task violation cost, and a behavior cost. The method includes receiving a selection of a feasible schedule as a preferred schedule and determining a first trait and a second trait of each member based thereon. The first trait includes selfishness assumed when the feasible schedule selected places a higher total schedule cost on other members. The second trait includes selflessness assumed when the feasible schedule selected places a lower total schedule cost on the other members. The method includes generating a collaborative schedule as the feasible schedule selected by the members.

20 Claims, 8 Drawing Sheets

(56) References Cited

U.S. PATENT DOCUMENTS

| | | | |
|---|---|---|---|
| 2015/0134386 A1* | 5/2015 | Jogalekar | G06Q 10/063118 705/7.13 |
| 2015/0220871 A1* | 8/2015 | Rajan | G06Q 10/063112 705/7.14 |
| 2015/0379108 A1* | 12/2015 | Mital | G06Q 10/067 707/600 |

OTHER PUBLICATIONS

Cooper, R., & Kaplan, R. S. (1992). Activity-Based Systems: Measuring the Costs of Resource Usage. Accounting Horizons, 1-13 (Year: 1992).*

Zhang, Qingquan & Gu, Yu & Gu, Lin & Cao, Qing & He, Tian. (2011). Collaborative Scheduling in Highly Dynamic Environments Using Error Inference. IEEE Transactions on Parallel and Distributed Systems. 25. 105-114. 10.1109/MSN.2011.25. (Year: 2011).*

Cho, J., Swami, A., & Chen, I. (2010). Modeling and Analysis of Trust Management Protocols: Altruism versus Selfishness in MANETs. U.S. Army Research Laboratory Computational and Information Sciences Directorate, 141-156. (Year: 2010).*

Cooper, R., & Kaplan, R. S. (1992). V Activity-Based Systems: Measuring the Costs of Resource Usage. Accounting Horizons, 1-13 (Year: 1992).*

Saha, A., & Poole, G. (2000). The economics of crime and punishment: An analysis of optimal penalty. Economics Letters, 191-196. (Year: 2000).*

Valcarce, Daniel & Parapar, Javier & Barreiro, Alvaro. (2016). Additive Smoothing for Relevance-Based Language Modelling of Recommender Systems. 1-8. 10.1145/2934732.2934737 (Year: 2016).*

Aumann et al., Game theory, The New Palgrave, pp. 460-482, 1987.

Game Theory as a Theory of Conflect Resolution, ISBN 978-94-010-2161-6, Edited by Rapoport, Theory and Decision Library, 1974.

Colin F. Camerer, Teck-Hua Ho, Juin Kuan Chong; Advances in Understanding Strategic Behaviour, Chapter 8, Behavioural Game Theory: Thinking, Learning and Teaching, pp. 120-180, Palgrave Macmillan UK (2004).

F. Allen, and S. Morris, "Game Theory Models in France", Advances in Business Applications of Game Theory, Boston Kluwer Academic Publishers, 2001.

Ernst Fehr and Klaus M. Schmidt, A Theory of Fairness, Competition, and Cooperation, 1999.

Meekan Sceduing Robot, htttps://meekan.com/slack/ (retrieved Sep. 27, 2016).

Cozi Family Organizer, http://www.cozi.com/feature-overview/ (retrieved Sep. 27, 2016).

Hub Family Organizer: http://www.hubapp.com/ (retrieved Sep. 27, 2016).

* cited by examiner

| FEASIBLE SCHEDULES 216 | TOTAL SCHEDULE COSTS 218 | | |
| --- | --- | --- | --- |
| | FIRST MEMBER 113A | SECOND MEMBER 113B | THIRD MEMBER 113C |
| FIRST FEASIBLE SCHEDULE 216A | FIRST COST 402A (8) | FOURTH COST 402D (6) | SEVENTH COST 402G (1) |
| SECOND FEASIBLE SCHEDULE 216B | SECOND COST 402B (12) | FIFTH COST 402E (11) | EIGHTH COST 402H (14) |
| THIRD FEASIBLE SCHEDULE 216C | THIRD COST 402C (4) | SIXTH COST 402F (3) | NINTH COST 402I (6) |

COST TABLE 402

*FIG. 4*

COLLABORATIVE SCHEDULING

FIELD

The embodiments discussed herein are related to collaborative scheduling.

BACKGROUND

Existing group calendar applications may include an automatic scheduler agent. The group calendar applications may show a schedule of a set of individuals on a common platform. The group calendar applications may assist in the choice of a common time that may be convenient for the set of individuals for a task or an event. However, the existing group calendar applications may not provide scheduling when no time is convenient for the set of individuals. Additionally, the group calendar applications may base the common time on merging of times and tasks.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of collaborative scheduling may include setting, by a calendar server, an initial value for traits of each member or members who are included in a group to which a collaborative schedule pertains. The method may include receiving, at the calendar server, group inputs that include individual member tasks, mutual member tasks, individual member constraints, and mutual member constraints. The method may include receiving, at the calendar server, environmental data collected by a data collection engine. The method may include calculating, by the calendar server, collaborative schedule information based on the environmental data, the traits, and the group inputs. The collaborative schedule information may include a particular number of feasible schedules and total schedule costs that are associated with the feasible schedules for each member. The total schedule costs for each member may be based on an individual member performance cost, a flexible task violation cost, and a behavior cost. The method may include receiving, by the calendar server, feedback from each member. The feedback may include a selection of a feasible schedule as a preferred schedule. The method may include determining, by the calendar server, a first trait and a second trait of each member. The first trait may be assumed when the feasible schedule that is selected places a higher total schedule cost on other members. The second trait may be assumed when the feasible schedule that is selected places a lower total schedule cost on the other members. The method may include generating, by the calendar server, a collaborative schedule as the feasible schedule selected by the members. The method may include updating, by the calendar server, the traits of each member based on the received feedback.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 4 depicts an example cost table that may be implemented in the operating environment of FIG. 1;

DESCRIPTION OF EMBODIMENTS

Existing group calendar applications may assist in the choice of a common time that may be convenient for members of a group for a task or an event. However, the existing group calendar applications may not operate when no time is convenient for the members. For example, circumstances may exist in which no time works for the members.

In such circumstances, one or more of the members may be forced to compromise. Members may find it difficult to compromise by themselves. Thus, instead of compromising, members of a group may make collaborative decisions that cause a greater cost to the group without having the intention to do so. Thus, the existing group calendar applications may not consider the goal of benefiting all the members.

In addition, the existing group calendar applications do not consider the traits such as behavioral traits. Instead, the existing group calendar applications base common times on merging of time and task information. These existing group calendars thus miss an opportunity to allocate compromises based on traits of the members.

Accordingly, embodiments described in this disclosure demonstrate a larger gain that the group may obtain by accepting a schedule even if the schedule forces one or more members to compromise their self-interest. Some embodiments include communicating feasible schedules and total schedule costs for each of the members. Disclosure of this information may convince the members to accept a feasible schedule. In addition, some embodiments consider traits of the members in calculation of costs to the members.

Some embodiments may implement some principles of game theory, which is the study of mathematical models of conflict and cooperation between intelligent decision-makers. In general, a game involves players, information, and actions available at decision points and payoffs at outcomes. Based on the information, a set of strategies for the players may be deduced. When the set of strategies are employed, no player profits by unilaterally deviating from their strategy.

Some additional details of game theory may be found in AUMANN ET. AL, GAME THEORY, THE NEW PALGRAVE, pp. 460-82, (1987); CAMERER, TECK-HUA HO, AND J. K. CHONG, BEHAVIOURAL GAME THEORY: THINKING, LEARNING AND TEACHING, pp 311-336 (University of Chicago Press); GAME THEORY AS A THEORY OF CONFLICT RESOLUTION, ISBN 978-94-010-2161-6, Edited by Rapoport, Theory, and Decision Library, (1974); U.S. Pat. No. 8,863,293; and F. ALLEN, AND S. MORRIS, GAME THEORY MODELS IN FINANCE, IN ADVANCES IN BUSINESS APPLICATIONS OF GAME THEORY, (Boston Kluwer Academic Publishers), which are incorporated herein by reference in their entireties.

These and other embodiments are described with reference to the appended Figures. In the Figures, features with like item numbers have similar structure and function unless specified otherwise.

Figure 1:
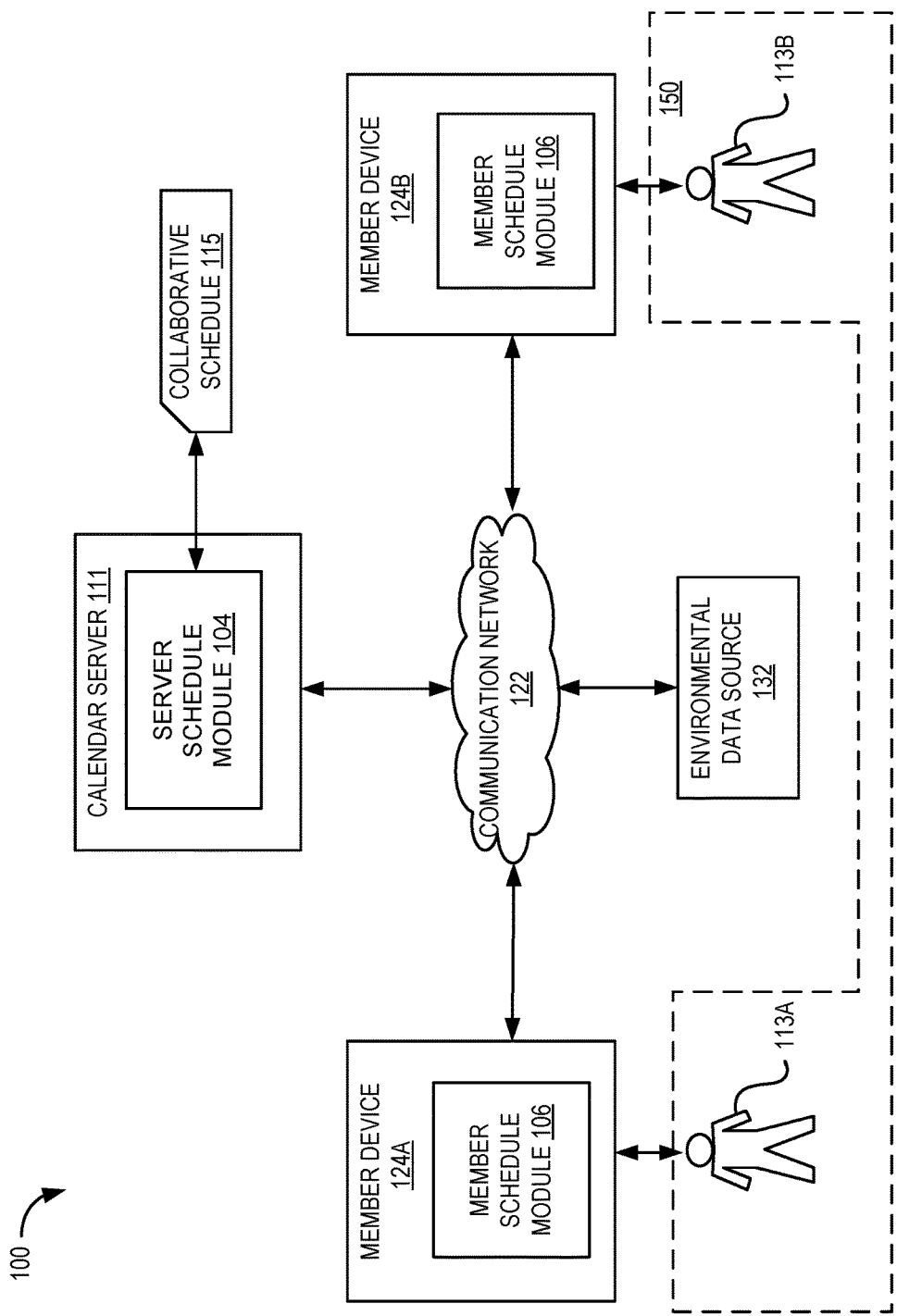
FIG. 1 is a block diagram of an example operating environment in which collaborative scheduling may be implemented.

FIG. 1 is a block diagram of an example operating environment 100 in which collaborative scheduling may be implemented. The collaborative scheduling may be used to manage multiple individual schedules and to generate a collaborative schedule 115 for members 113A and 113B (generally, member 113 or members 113) of a group 150 to which the collaborative schedule 115 pertains. Generally, the group 150 may share a common goal and may share one or more tasks and/or one or more constraints. An example of the group 150 may be a family and the members 113 in this example may be each member or the parents of the family. Another example of the group 150 may include a work team and the members 113 in this example may include employees who are included in the work team.

The collaborative schedule 115 may be generated based on group inputs that may be provided by the members 113 via member devices 124A and 124B (generally, member devices 124 or member device 124), environmental data that may be provided by the environmental data source 132, feedback from the members 113, and traits of the members 113 that may be computed by the calendar server 111 based on the feedback.

The group inputs may include tasks and constraints. The tasks may include any event or responsibility that one or more of the members 113 is to perform. Tasks performed by one of the members 113 may be referred to as an individual member task. Tasks performed by two or more of the members 113 or that are to be performed by at least one of the members 113 may be referred to as a mutual member task. The tasks may include errands, work responsibilities, projects, events, and the like. In some embodiments, the tasks may include hard tasks and flexible tasks. The hard tasks include tasks that are characterized as not being subject to violation. For instance, the hard task is complete as specified by the input from the members 113. The flexible tasks include tasks that are characterized as being subject to change or violation. For example, violation of the flexible tasks may indicate that the task is not complete, is complete partially, is complete at a different time, is complete by another individual, or some combination thereof. The collaborative schedule 115 may be generated to incorporate the hard tasks without modification. The collaborative schedule 115 may be generated to incorporate the flexible task; however, one or more of the flexible tasks may be violated.

The constraints may include any limitation that may prohibit or constrain performance of one or more of the tasks. For instance, the constraints may include a physical limitation, a pragmatic consideration, equipment availability, etc. Some examples of constraint may be the availability of only one automobile by a family, children that attend the same school and may commute together, a budget for a project, and the like.

The collaborative schedule 115 may be generated based on collaborative schedule information. The collaborative schedule information may include a particular number (e.g. two or more) of feasible schedules and total schedule costs. The feasible schedules include combinations of the tasks and the constraints of the members 113. In the feasible schedules the tasks are complete by the members 113 and the constraints are not violated.

In addition, the collaborative schedule 115 may be based on total schedule costs for the members 113 for the feasible schedules. Combining the tasks and the constraints of the group 150 may result in the imposition of some additional amount of inconvenience, time, resource allocation, money, etc. on one or more of the members 113. As described in this disclosure, this imposition is referred to as the total schedule costs for the members 113. One or more of the feasible schedules may disproportionately impose the total schedule cost on a first member 113A rather than a second member 113B. The calendar server 111 communicates the feasible schedules and the total schedule costs to the members 113. Based on the feasible schedules and the total schedule costs, the collaborative schedule 115 may be generated.

The collaborative schedule 115 may be further based on traits of the members 113. The traits may include a first trait. The first trait may be selflessness, in some embodiments of this disclosure. The term 'selflessness' is used to describe a behavior of allowing imposition of higher total schedule costs on oneself rather than imposing the higher total schedule costs on other members 113. The traits may also include a second trait. The second trait may be selfishness, in some embodiments of this disclosure. The term 'selfishness' is used to describe a behavior of imposing higher total schedule costs on other members 113 rather than imposing the higher total schedule costs on oneself. In some embodiments, there may be one or more additional traits, which may depend on a situation that is being considered in the operating environment 100.

The traits of the members 113 may be updated as feedback is received from the members 113. The traits may then be incorporated into computation of the total schedule costs. For instance, the first member 113 may have previously responded selflessly to feasible schedules. In a current or upcoming feasible schedule, the total schedule cost may consider that the selflessness of the first member in computation of the total schedule cost. Thus, the collaborative schedule 115 may more accurately reflect the total schedule costs imposed on the members 113 of the group 150. For example, the total schedule costs are based on total commute time, which may be disproportionately imposed on the first member 113A. However, if the first member 113A does not mind commuting, then the total schedule costs will adapt to reflect the willingness of the first member 113A to commute.

The operating environment 100 may include the calendar server 111, the member devices 124, the environmental data source 132, and a communication network 122 (network 122). The calendar server 111, the member devices 124, the environmental data source 132, and the network 122 are collectively referred to as environmental components in this disclosure. The environmental components may be configured to exchange information and data for use in generation of the collaborative schedule 115. Each of the environmental components is briefly introduced below.

The network 122 may include wired or wireless configurations, and may have configurations including a star configuration, token ring configuration, or other configurations. Furthermore, the network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols.

In some embodiments, the network 122 includes BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc.

The environmental data source 132 may include any system on which environmental data may be accessed or from which the environmental data may be provided. For example, the environmental data source 132 may include a hardware server that is coupled to the network 122 for communication with the other environmental components.

The environmental data may include any information other than the tasks and the constraints that may be used in generation of the collaborative schedule 115. The environmental data may provide physical context or limitations to the tasks and/or constraints. For example, the environmental data may include an address of a school attended by the first member 113 and/or a map to the school. The environmental data source 132 may include a map application (e.g., GOOGLE MAPS®) that is accessed by the calendar server 111 and/or the member devices 124. Additionally or alternatively, the environmental data may include weather conditions, traffic conditions, train/bus schedules, operating limitations of equipment, and the like. The environmental data source 132 may correspond to the type of environmental data. For instance, the environmental data source 132 may include a weather website when the environmental data is weather data.

The member devices 124 may include any computing system that includes a processor, memory, and computing capabilities. In the illustrated embodiments, the member devices 124 may be coupled to the network 122 to send and receive information with one or more of the environment components via the network 122. For example, the member devices 124 may be configured to communicate tasks and/or constraints to the calendar server 111. In addition, the member devices 124 may be configured to receive the feasible schedules and/or the total schedule costs from the calendar server 111. The member devices 124 may display or cause the display of the feasible schedules and/or the total schedule costs such that the members 113 may view them. The members 113 may then provide user input to the member devices 124 via a user interface device to the member device 124. The user input may be communicated to the calendar server 111 and interpreted by the calendar server 111 as the feedback. Some examples of the member device 124 may include a smart phone, a desktop computer, and the like.

The members 113 may be associated with the member devices 124. As used in this disclosure, the term "associated with" may indicate that the members 113 owns or regularly operates the member devices 124. Such association may be one-to-one as depicted in FIG. 1. In other embodiments, multiple members 113 may interface with a single member device 124.

The member device 124 may include member schedule modules 106. The member schedule modules 106 may be configured to interface with the member 113 for receipt of user input (e.g., the feedback, the task, the constraints, etc.) and for communication of data and information (e.g., display of the feasible schedules and/or total schedule costs). Additionally, in some embodiments, the member schedule modules 106 may be configured to compute the total schedule costs and/or determination of the feasible schedules as described elsewhere in this disclosure. For instance, some embodiments may omit the calendar server 111. In these and other embodiments, the member schedule module 106 may be configured to compute the total schedule costs and/or determination of the feasible schedules. Some additional details of these embodiments are provided elsewhere in this disclosure.

The member schedule modules 106 may be implemented using hardware including a processor, a microprocessor (e.g., to perform or control performance of one or more operations), a field-programmable gate array (FPGA), or an application-specific integrated circuit (ASIC). In some other instances, the member schedule modules 106 may be implemented using a combination of hardware and software. Implementation in software may include rapid activation and deactivation of one or more transistors or transistor elements such as may be included in hardware of a computing system (e.g., the member device 124). Additionally, software defined instructions may operate on information within transistor elements. Implementation of software instructions may at least temporarily reconfigure electronic pathways and transform computing hardware.

The calendar server 111 may include a hardware server that includes a processor, memory, and communication capabilities. In the illustrated embodiments, the calendar server 111 may be coupled to the network 122 to send and receive data and information to and from one or more of the environment components via the network 122.

The calendar server 111 may include a server schedule module 104. The server schedule module 104 may be configured to generate the collaborative schedule 115 based on the group inputs, the environmental data, the feedback, or some combination thereof. For example, the server schedule module 104 may be configured to receive group inputs that include the tasks and the constraints from the member devices 124 and the environmental data from environmental data source 132.

The server schedule module 104 may be configured to calculate collaborative schedule information based on the environmental data, the traits, and the group inputs. For example, the server schedule module 104 may be configured to calculate a particular number of feasible schedules and total schedule costs that are associated with the feasible schedules for the member 113.

The server schedule module 104 may communicate the collaborative schedule information to the member devices and to receive feedback from the members 113. The server schedule module 104 may be configured to determine the traits of the members based on the feedback. The server schedule module 104 may be configured to update the traits of the members based on the received feedback. In some embodiments, server schedule module 104 may be configured to set an initial value for traits of the members 113 and update the initial value. The server schedule module 104 may be configured to generate the collaborative schedule 115 as one of the feasible schedules that is selected by or highly ranked among the members 113.

The server schedule module 104 may be implemented using hardware including a processor, a microprocessor (e.g., to perform or control performance of one or more operations), an FPGA, or an ASIC. In some other instances, the server schedule module 104 may be implemented using a combination of hardware and software. Implementation in software may include rapid activation and deactivation of one or more transistors or transistor elements such as may be included in hardware of a computing system (e.g., the calendar server 111). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. The present disclosure may apply to operating environments that may include one or more calendar servers 111, one or more member devices 124, one or more environmental data sources 132, one or more members 113, one or more groups 150, one or more networks 122, or any combination thereof. For example, the operating environment 100 may include multiple groups 150 having multiple members 113, which may overlap into the multiple groups.

Moreover, the separation of various components in the embodiments described herein is not meant to indicate that the separation occurs in all embodiments. It may be understood with the benefit of this disclosure that the described components may be integrated together in a single component or separated into multiple components.

Figure 2:
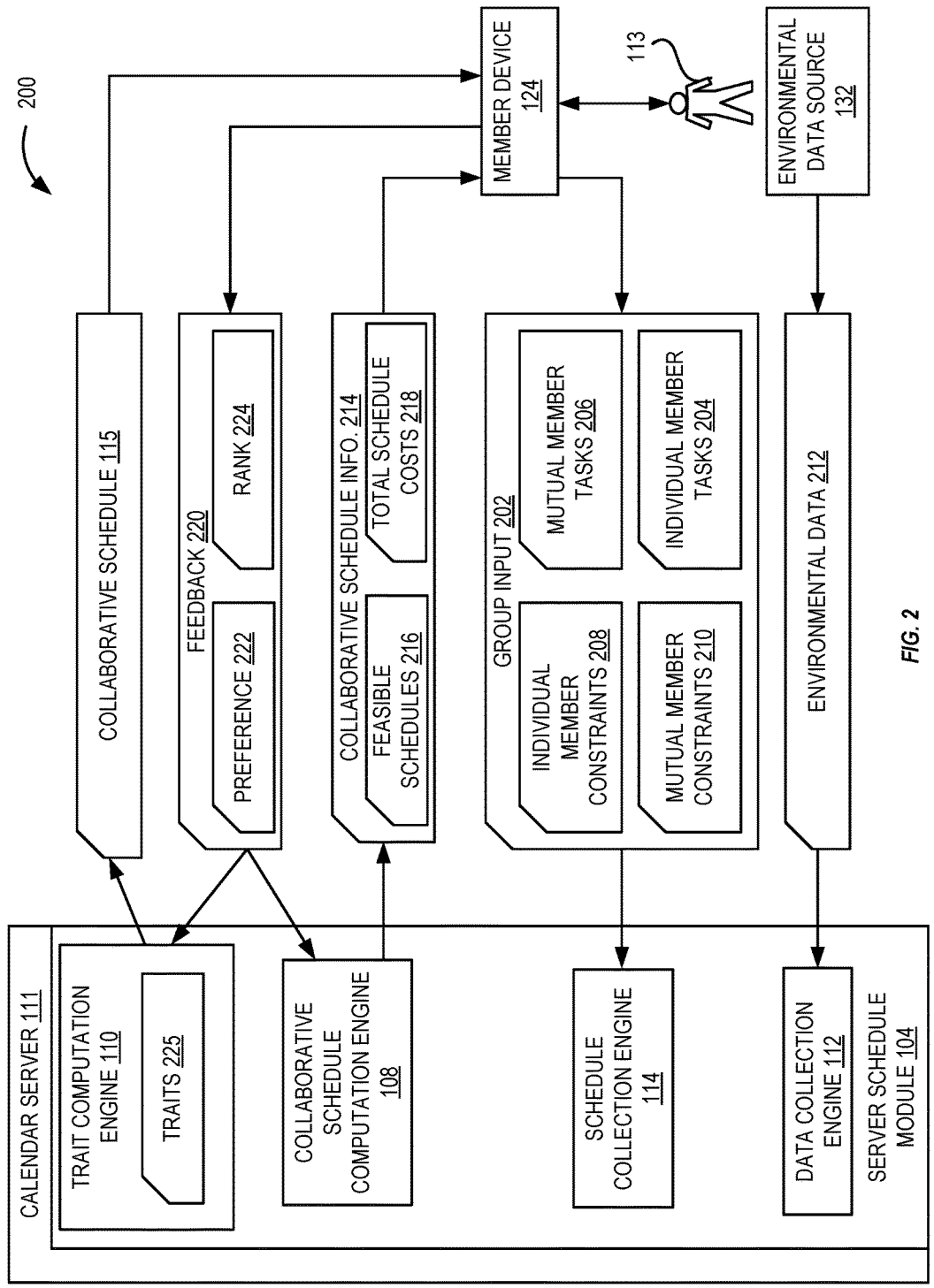
FIG. 2 depicts an example scheduling process that may be implemented in the operating environment of FIG. 1.

FIG. 2 depicts an example scheduling process 200 that may be implemented in the operating environment 100 of FIG. 1. FIG. 2 includes the calendar server 111, the member device 124, the environmental data source 132, and the member 113 described with reference to FIG. 1. Although not depicted in FIG. 2, communication during the scheduling process 200 may be via the network 122 of FIG. 1 or some portion thereof.

In the embodiment of FIG. 2, the server schedule module 104 may include a data collection engine 112. The data collection engine 112 may be configured to access or receive environmental data 212 from the environmental data source 132. The environmental data 212 may take the form of digital data that is communicated via the network 122 of FIG. 1.

The server schedule module 104 may also include a schedule collection engine 114. The schedule collection engine 114 may be configured to receive or access the group input 202 from the member device 124. For instance, the member 113 may interface with the member device 124 to provide user input, which may then be communicated to the schedule collection engine 114. Additionally or alternatively, the schedule collection engine 114 may access one or more applications run on the member device 124 to obtain the group input 202.

The group input 202 may include individual member constraints 208, mutual member constraints 210, mutual member tasks 206, individual member tasks 204, or some combination thereof. The individual member constraints 208 may include a constraint that is only relevant to one of the members 113. For example, the member 113 must be at work no later than 8:10 AM or the member 113 only works a maximum of thirty hours per week. The mutual member constraints 210 may include constraints that apply to two or more or all of the members 113. For example, the mutual member constraints 210 may include a budget that is applicable for a project for which the collaborative schedule 115 is generated. Additionally, the mutual member constraints 210 may include a constraint that is applicable to a subset of the members 113 such as a first member and a second member do not work on Sundays. The mutual member tasks 206 may include tasks in which two or more or all of the members 113 participate or at least one of the members 113 is to complete. The individual member tasks 204 may include tasks in which one of the members 113 participate. As discussed above, the mutual member tasks 206 and/or the individual member tasks 204 may include hard tasks and flexible tasks. The mutual member tasks 206 and the individual member tasks 204 may be collectively referred to as the tasks 204 and 206.

The server schedule module 104 may include a collaborative schedule computation engine 108. The group input 202 and the environmental data 212 may be received by the collaborative schedule computation engine 108. Based on the group input 202 and the environmental data 212, the collaborative schedule computation engine 108 may calculate the collaborative schedule information 214 (in FIG. 2, "collaborative schedule info. 214"). The collaborative schedule information 214 may include feasible schedules 216 and total schedule costs 218.

The collaborative schedule computation engine 108 may be configured to calculate the feasible schedules 216 as a subset of all possible schedules in which the tasks 206 and 204 are achievable without violating any of the constraints 208 and 210. In some embodiments, calculation of the feasible schedules 216 may include enumeration of all possible schedules that include completion of the individual member tasks 204 and the mutual member tasks 206. All possible schedules may include schedules that impose high total schedule costs 218 on one of the members 113 (e.g., performing the mutual member tasks 206) and schedules that violate the constraints 208 and 210.

To enumerate all the possible schedules, the collaborative schedule computation engine 108 may define a vector for the individual member tasks 204 and for the mutual member tasks 206. The vectors may be formatted as:

[start time, end time, start location, end location].

For instance, an example task may include being at work by 9:00 AM. The vector for the example task may be defined as:

[X, >9 AM, Z, work address].

Constraints for the example task may include X<9 AM and Z does not equal the work address.

The collaborative schedule computation engine 108 may divide the individual member tasks 204 and the mutual member tasks 206 into a particular number of task groups. The task groups may have the start time or the end time within a particular time frame. For example, the tasks 204 and 206 that have a start time or an end time in the morning (e.g., before 12:00 PM) may be in a first task group and the tasks 204 and 206 that have a start time or an end time in the evening (e.g., between 12:00 PM and 10:00 PM) may be in a second task group.

For instance in addition to the example task above ([X, >9 AM, Z, work address]) there may be a second example task. The second example task may be defined by the vector [a, >7 AM, b, daycare], which may be representative of a task to get a child to daycare before 7 AM. Because the example task and the second example task both have an end time in the morning, they may both be in a first task group.

For the tasks 204 and 206 in the tasks groups, the collaborative schedule computation engine 108 may consider one or more possibilities for unknown location parameters. For instance, using the example task and the second example task described above, the collaborative schedule computation engine 108 may consider possibilities for "Z" and "b" of the example task. For example, "Z" and "b" may be "home." Accordingly, the start point for each of the example task and the second example task may be home. Alternatively, the "Z" may be "daycare" and the member may drive from "daycare" to "work." Additionally, "b" may be "home". Thus, the member 113 may drive from "home" to "daycare" and from "daycare" to "work."

The collaborative schedule computation engine 108 may choose vectors that exhibit continuity in one or more unknown locations. Accordingly, in the above example, the collaborative schedule computation engine 108 may select the "Z" to be "daycare" and "b" to be "home" because of the continuity in the unknown locations. Accordingly, the vectors for the example task and the second example task may be:

[a, >7 AM, home, daycare]
[X, >9 AM, daycare, work address]

The collaborative schedule computation engine 108 may then find unknown values for the start times or for the end times that satisfy the individual member constraints 208 and the mutual member constraints 210. For example, for the example task and the second example task, the commute time between the "home" and the "daycare" may be about 30 minutes and the commute time between the "daycare" and the "work" may be about 60 minutes. Accordingly, when "Z" is selected to be "daycare" and "b" is selected to be "home", thus X>8 AM and a>6:30 AM.

The collaborative schedule computation engine 108 may then identify the feasible schedules 216 as a subset of the possible schedules that are achievable without violation of the individual member constraints 208 or the mutual member constraints 210. Because the above example may be complete without violating the constraints, it may be included in the feasible schedules 216.

The collaborative schedule computation engine 108 may also compute the total schedule costs 218 for one or more members 113 and for one or more of the feasible schedules 216. The total schedule costs 218 may be computed according to total schedule cost expressions:

$$C_t(S_i, u_j) = C_1(S_i, u_j) - C_2(S_i, u_j),$$

$$C_1(S_i, u_j) = C_p(S_i, u_j) - \gamma C_v(S_i, u_j); \text{ and}$$

$$C_2(S_i, u_j) = \Sigma_k \alpha_{(j,k)} \max[C_1(S_i, u_j) - C_1(S_i, u_k), 0] + \Sigma_k \beta_{(j,k)} \max[C_1(S_i, u_k) - C_1(S_i, u_j), 0].$$

In the total schedule cost expressions, i, j, and k represent indexing variables. The parameter $S_i$ represents one of the feasible schedules 216 identified by an indexing variable. The parameter $u_j$ represents one of the members 113 identified by another indexing variable. The parameter $C_t(S_i, u_j)$ represents a total schedule cost 218 for one of the members 113 and for one of the feasible schedules 216. The parameter $C_1(S_i, u_j)$ represents individual costs incurred by one of the members 113 and for one of the feasible schedules 216. The parameter $C_2(S_i, u_j)$ represents behavior costs incurred by one of the members 113 and for one of the feasible schedules 216. The parameter $C_p(S_i, u_j)$ represents an individual member performance cost of one of the feasible schedules 216 for one of the members 113. The parameter $C_v(S_i, u_j)$ represents a flexible task violation cost while performing one of the feasible schedules 216 for one of the members 113. The parameter γ represents a penalty factor which decreases the individual costs if any feasible tasks (e.g., 206 and 204) are violated. The parameter max represents a maximizing function. The parameter $\alpha_{(j,k)}$ represents a selflessness parameter that is independent of the feasible schedule 216. The parameter $\beta_{(j,k)}$ represents a selfishness parameter that is independent of the feasible schedule 216. The expression $\Sigma_k \alpha_{(j,k)} \max[C_1(S_i, u_j) - C_1(S_i, u_k), 0]$ represents a selflessness expression. The expression $\Sigma_k \beta_{(j,k)} \max[C_1(S_i, u_k) - C_1(S_i, u_j), 0]$ represents a selfishness expression.

According to the total schedule cost expressions above, the total schedule costs 218 may be based on an individual cost incurred by one of the members 113 and behavioral cost incurred by one of the members 113. The individual cost may be based on the performance cost incurred by performing one of the feasible schedules 216. The performance cost is reduced by the flexible task violation cost, which is a cost associated with flexible tasks that are violated while performing the feasible schedule 216. The flexible task violation cost is multiplied by the penalty factor.

The behavior cost takes into consideration the traits of the members 113 which are represented by the selflessness parameter and the selfishness parameter. The selflessness parameter and the selfishness parameter are independent of the feasible schedule 216 and instead associated with the member 113. Some details of determination of the selflessness parameter and the selfishness parameter are provided elsewhere in this disclosure.

The collaborative schedule information 214 may be communicated to the member device 124. At the member device 124, the collaborative schedule information 214 may be reviewed by the member 113. In some embodiments, the collaborative schedule information 214 may be included in a cost table that is communicated to the member device. An example of the cost table is provided elsewhere in this disclosure. In response, feedback 220 may be communicated from the member device 124 to the calendar server 111. The feedback 220 may include a selection of one of the feasible schedules 216 or a rank of the feasible schedules 216 relative to one another. For instance, a particular number of the feasible schedules 216 and the total schedule costs 218 may be communicated to the member device 124. In response, the member 113 may select one of the feasible schedules 216 as a preference 222 or a rank 224 of the feasible schedules 216.

The feedback 220 may be communicated to the collaborative schedule computation engine 108. Based on the feedback 220, the collaborative schedule computation engine 108 may generate the collaborative schedule 115. For instance, the collaborative schedule computation engine 108 may generate the collaborative schedule 115 as the feasible schedule 216 selected by the members 113 or ranked highest by the members 113.

In some embodiments, the server schedule module 104 may include a trait computation engine 110. The trait computation engine 110 may be configured to determine traits 225 of the members 113. To generate an initial collaborative schedule 115, the trait computation engine 110 may be configured to set an initial value for the behavioral traits 225 of the members 113. The trait computation engine 110 may be configured to update the traits 225 of the members 113 based on the received feedback 220.

For example, the trait computation engine 110 may be configured to determine the traits 225 at least in part on the feedback 220. The determination may include estimation of the selflessness parameter and the selfishness parameter at least in part on the feedback 220. The estimation may include categorization of the mutual member tasks 206. The mutual member tasks 206 may be categorized as constrained mutual tasks and neutral mutual tasks. The constrained mutual tasks may include tasks that involve at least one member to act in a selfish or selfless manner. The neutral mutual tasks may include tasks that may be completed without the need for any of the members 113 to be selfish or selfless.

In these and other embodiments, the estimating may include calculating a probability the member 113 responds to a neutral mutual task. The calculating the probability the member 113 responds to the neutral mutual task may be performed according to a neutral mutual task expression:

$$P_i^n = \frac{\mu_i}{N}.$$

In the neutral mutual task expression, $P_i^n$ represents the probability the member 113 responds to the neutral mutual task. The parameter $\mu_i$ represents a number of times the member 113 responded to a neutral mutual task. The parameter N represents a total number of neutral mutual tasks.

The estimating may include calculating a probability the member 113 responds to a constrained mutual task in a selfless manner. The calculation of the probability the member 113 responds to the constrained mutual task in the selfless manner may be performed according to a selfless mutual task expression:

$$P_i^{sl} = \frac{\sigma_i}{Q}.$$

In the selfless mutual task expression, $P_i^{sl}$ represents the probability the member 113 responds to the constrained mutual task in a selfless manner. The parameter $\sigma_i$ represents a number of times the member 113 responded to a selfless mutual task. The parameter Q represents a total number of constrained mutual tasks.

The estimating may include calculating a probability the member 113 responds to a constrained mutual task in a selfish manner. The calculation of the probability the member 113 responds to the constrained mutual task in the selfish manner may be performed according to a selfish mutual task expression:

$$P_i^s = \frac{T_i}{Q}.$$

In the selfish mutual task expression, $P_i^s$ represents the probability the member 113 responds to the constrained mutual task in a selfish manner. The parameter $T_i$ represents a number of times a member responded to a selfish mutual task. The parameter Q is as described above.

In some embodiments, the calculating the probability the member 113 responds to the constrained mutual task in the selfish manner and calculation of the probability the member 113 responds to the constrained mutual task in the selfless manner may be based on a histogram and a Laplace smoothing of the data plotted in the histogram.

Figure 5:
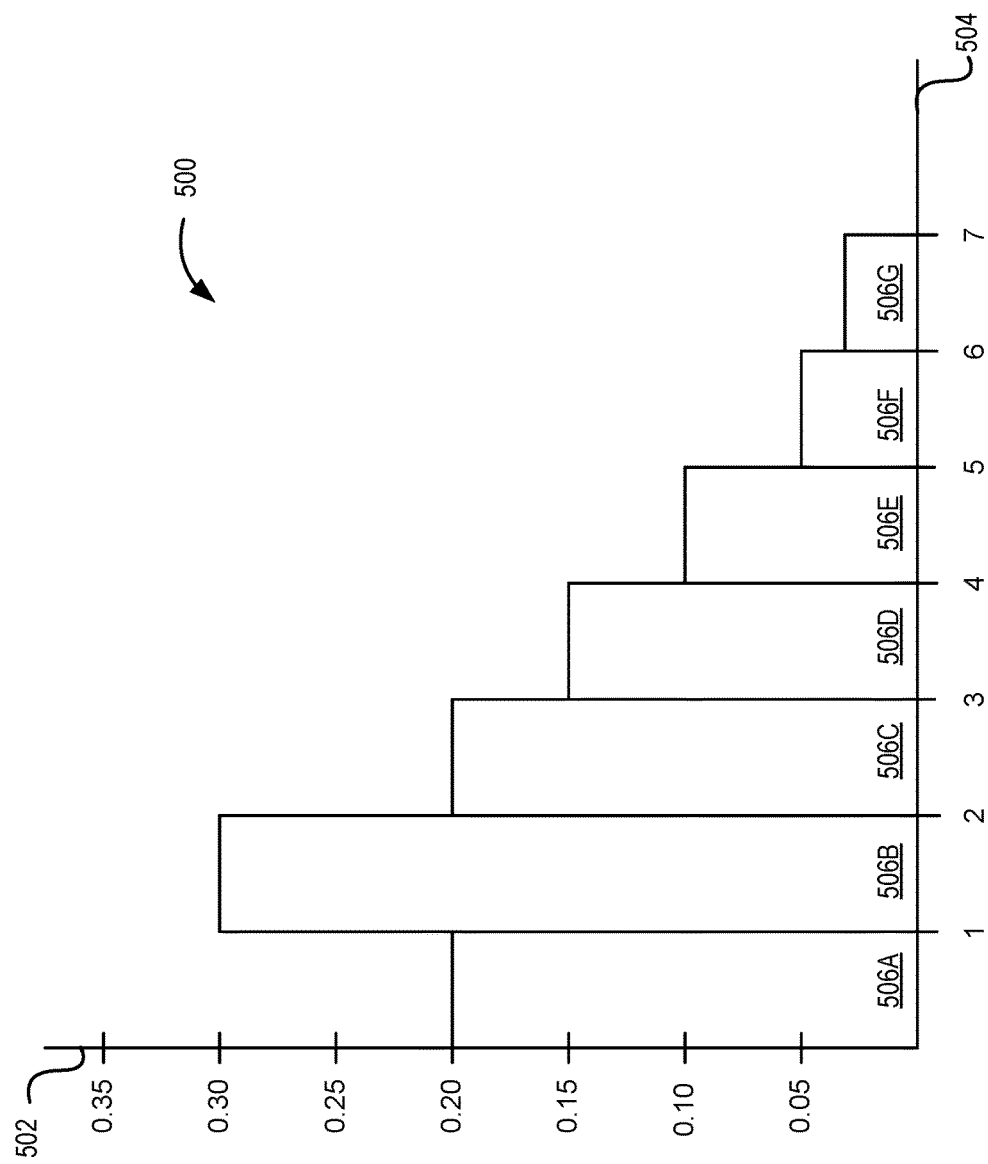
FIG. 5 depicts an example histogram plot that may be implemented in the operating environment of FIG. 1.
Figure 6:
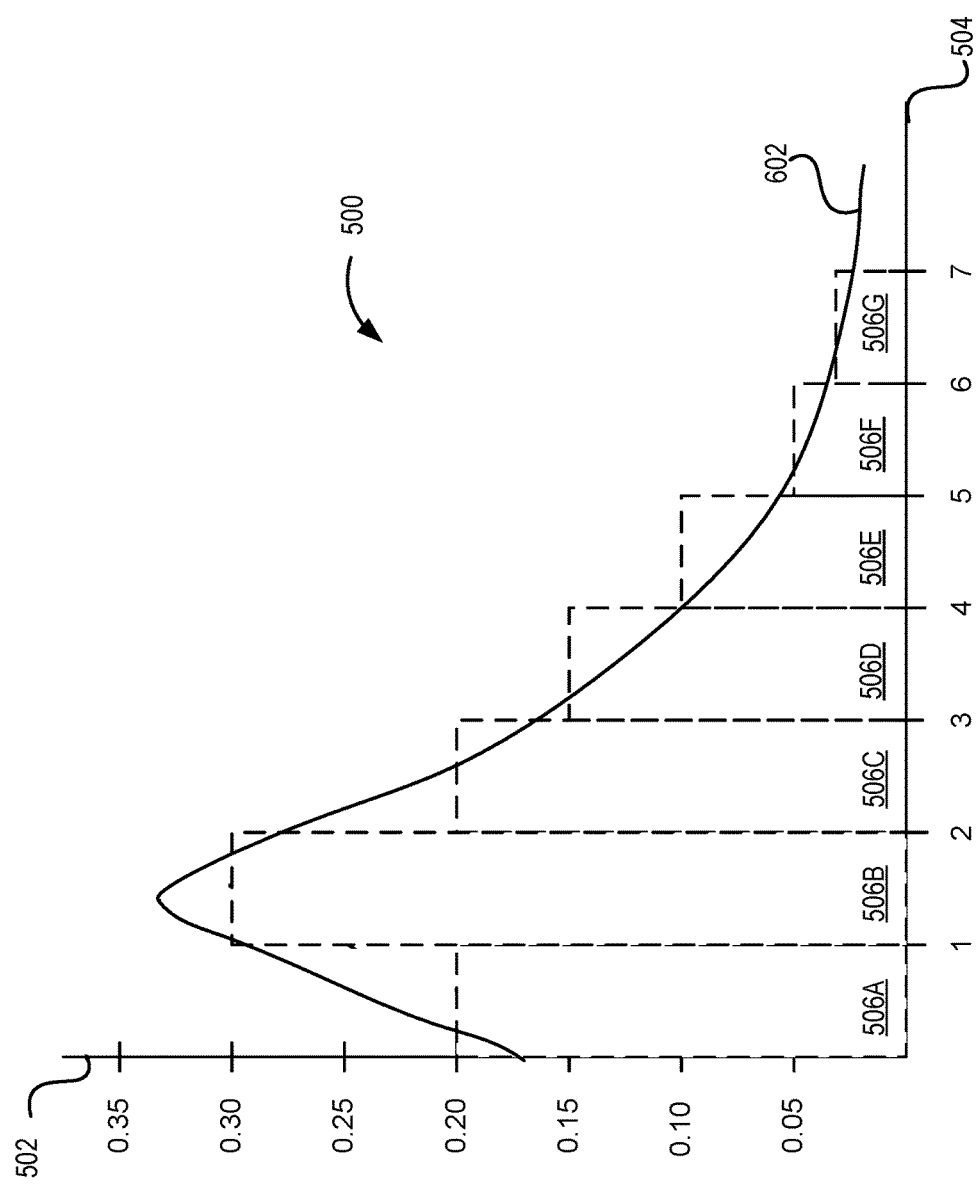
FIG. 6 depicts Laplace smoothing of the plotted data of the histogram plot of FIG. 5.

FIGS. 5 and 6 depict example plotted data (data) 500. With combined reference to FIGS. 2, 5, and 6, the plotted data 500 includes probability data that a particular member 113 responds to a constrained mutual task in a selfless manner. Similar data may be plotted for a probability that the member 113 responds to a constrained mutual task in a selfish manner. Generally, the plotted data 500 of FIGS. 5 and 6 may be based on feedback (e.g., preferences 222 and/or rank 224 of feasible schedules 216 of FIG. 2) from the members 113 in circumstances similar to a current or an upcoming circumstance. The circumstances and determination of similarity between circumstances may be based on a commonality of the environmental data, a group including the same or a similar subset of members, a period of time, and the like. For example, the probability represented in FIG. 5 and FIG. 6 may be determined for a collaborative schedule for a group that includes a first member, a second member, and a third member and may be for commuting schedules of the group during December. Accordingly, the plotted data 500 may be representative of the feedback 220 that was received for the group and/or for commuting schedules from a previous December.

FIG. 5 depicts an example histogram plot that may be implemented in the operating environment 100 of FIG. 1. FIG. 6 depicts Laplace smoothing of the plotted data 500 of the histogram plot of FIG. 5. In the histogram plot of FIG. 5 and the Laplace smoothing of FIG. 6, the x-axis 504 represents tasks. In FIGS. 5 and 6, there are seven tasks. In some embodiments, plotted data 500 may include more than or fewer than seven tasks. The y-axis 502 represents probabilities. The probabilities may be calculated according to one or more of the probability expressions. For instance, the probabilities of FIGS. 5 and 6 may be calculated according to the selfless mutual task expression described above. In other embodiments, the probabilities may be calculated according to the selfish mutual task expression and/or the neutral mutual task expression described above.

For example, a first data point 506A may be for a first task. The first data point 506A may indicate that there was a 0.20 probability that the particular member 113 responds to a constrained mutual task in a selfless manner. Similarly, a second data point 506B, a third data point 506C, a fourth data point 506D, a fifth data point 506E, a sixth data point 506F, a seventh data point 506G may be for a second task, third task, fourth task, fifth task, sixth task, and seventh task, respectively. The probabilities that the particular member 113 responds to a constrained mutual task in a selfless manner are 0.20, 0.30, 0.20, 0.15, 0.10, 0.05, and 0.25, respectively.

With reference to FIG. 6, a Laplace smoothing may be used to estimate the probability that the particular member 113 responds to a constrained mutual task in a selfless manner. The graphical representation of the Laplace smoothing is labeled 602 in FIG. 6.

Accordingly, using the Laplace smoothing, the selflessness parameter may be computed according to selflessness expressions:

$$\alpha_{(i,j)} = (\sigma_i + 1)/(N+s); \text{ and}$$

$$s = t \text{ COMB } x.$$

In the selflessness expressions, the parameters $\alpha_{(i,j)}$, $\sigma_i$, and N are as described above. The parameter s represents a total number of assumable combinations of the constrained task. For example, if there are two constrained tasks and the member 113 may respond to each either selfishly or selflessly, then the total number of an assumable combination is four (e.g., [{selfless, selfless}, {selfish, selfless}, {selfish, selfish}, {selfless, selfish}]). The parameter t represents the traits (e.g., selfish or selfless). The parameter x represents a number of the members 113. The operator COMB represents a combination operator.

Similarly, using the Laplace smoothing, the selfishness parameter may be computed according to selfishness expressions:

$$\beta_{(i,j)} = (T_i+1)/(N+s); \text{ and}$$

$$s = t \text{ COMB } x.$$

In the selfishness expressions the parameters are as described above.

Figure 3:
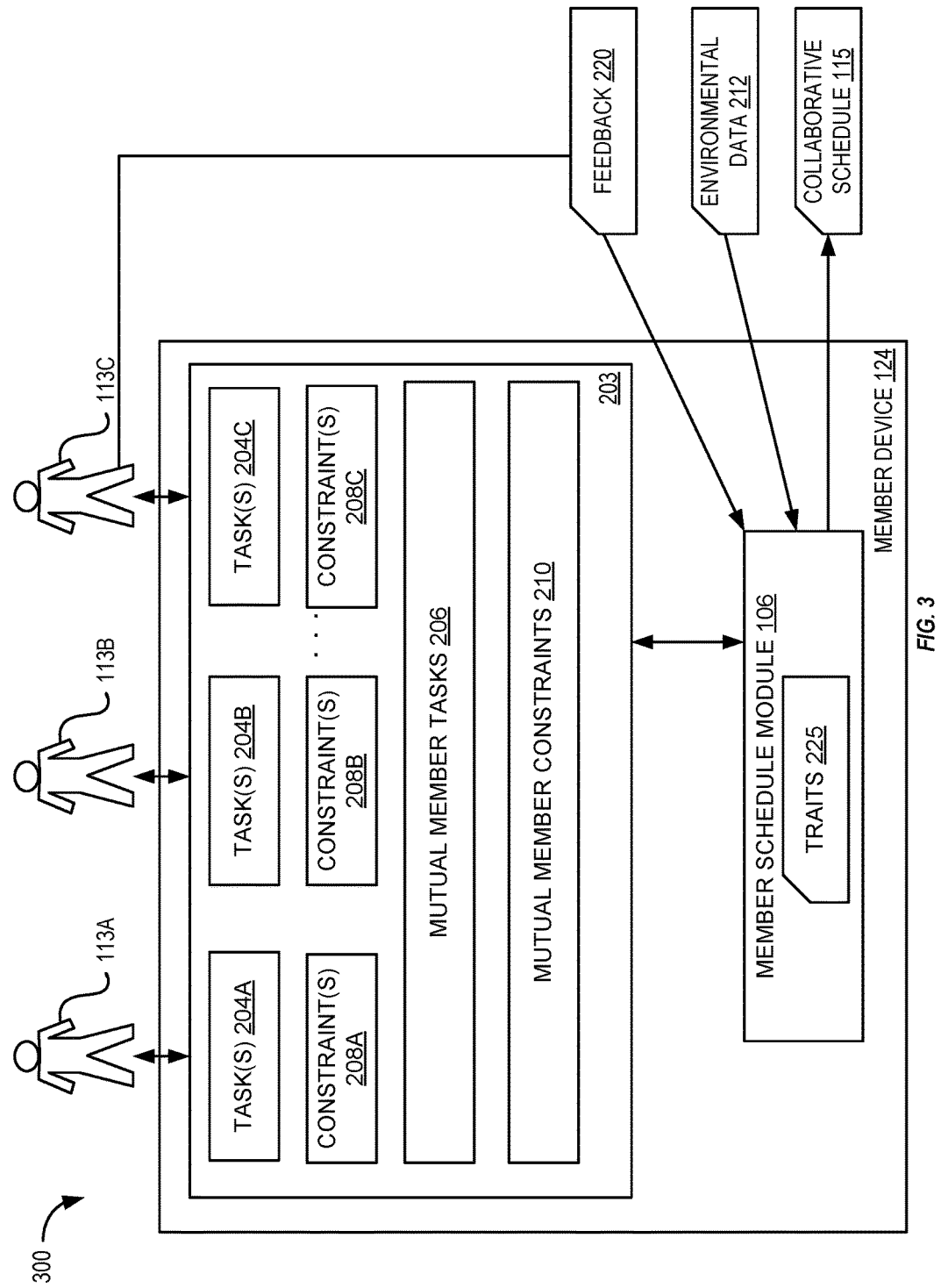
FIG. 3 illustrates a block diagram of an example member device that is configured for local implementation of the scheduling process of FIG. 2.

The embodiments described in FIGS. 1 and 2 include a collaborative scheduling process 200 and operating environment 100 that is server-based. In some embodiments, instead of the scheduling process 200 being server-based, it may be implemented locally at a member device 124. For example, FIG. 3 illustrates a block diagram of an example member device 124 that is configured for local implementation of a collaborative scheduling process. The local implementation may be substantially similar to the scheduling process 200 described with reference to FIG. 2. However, the members 113A-113C may provide group inputs 203 to the member device 124. The member device 124 may include an embodiment of the member schedule module 106. The member schedule module 106 is configured to generate the collaborative schedule 115 implementing a process similar to the scheduling process 200 described with reference to FIG. 2.

For example, the member schedule module 106 may be configured to generate the collaborative schedule 115 based on the group inputs 203, the environmental data 212, the feedback 220, or some combination thereof. For example, the member schedule module 106 may be configured to receive the group inputs 203 that include the tasks 204 and 206 and the constraints 208 and 210 and the environmental data 212 from an environmental data source (e.g., 132 of FIGS. 1 and 2).

The member schedule module 106 may be configured to calculate collaborative schedule information based on the environmental data 212, the traits 225, and the group inputs 203. For example, the member schedule module 106 may be configured to calculate a particular number of feasible schedules and total schedule costs that are associated with the feasible schedules for the member 113.

The member schedule module 106 may display or otherwise present the collaborative schedule information on the member device 124 and receive feedback 220 from the members 113. The member schedule module 106 may be configured to determine the traits 225 of the members 113 based at least partially on the feedback 220. The member schedule module 106 may be configured to update the traits 225 of the members 113 based on the received feedback 220. In some embodiments, member schedule module 106 may be configured to set an initial value for traits 225 of the members 113 and update the initial value. The member schedule module 106 may be configured to generate the collaborative schedule 115 as the feasible schedules selected by the members 113.

FIG. 4 depicts an example cost table 402 that may be implemented in the operating environment 100 of FIG. 1. The cost table 402 may be created by the calendar server 111 described elsewhere in this disclosure. The cost table 402 may include the total schedule costs 218 for each of the feasible schedules 216 for one or more of the members 113A-113C in FIG. 4. The cost table 402 may be communicated to the member devices 124 of FIGS. 1 and 2. The cost table 402 or some portion thereof may be configured to display on the member devices 124. Accordingly, one of the members 113 may be able to view or otherwise be exposed to the information included in the cost table 402. In some embodiments, based on the cost table 402, the members 113 may select one of the feasible schedules 216 or may rank each of the feasible schedules 216 relative to one another. For instance, a third member 113C may select the first feasible schedule 216A. Feedback including the selection of the first feasible schedule 216A may be communicated from one of the member devices 124 associated with the third member 113C to the calendar server 111. Additionally or alternatively, the feedback may include a ranking of the feasible schedules 216. For instance, the third member 113C may rank the first feasible schedule 216A as the best, followed by the third feasible schedule 216C, and followed by the second feasible schedule 216B. Feedback including the ranking of the feasible schedules 216 may be communicated from one of the member devices 124 associated with the third member 113C to the calendar server 111.

In the cost table 402, there may be a total schedule cost 402A-402I (in FIG. 4 "first cost," "second cost," "third cost," etc.) for each of the members 113 and for each of the feasible schedules 216A-216C. For instance, there may be a first cost 402A incurred by the first member 113A for a first feasible schedule 216. The other total schedule costs 402B-402I are for each of the members 113 for each of the feasible schedules 216.

In the cost table 402, there is a number in parenthesis. The number in parenthesis in each of the total schedule costs 402A-402I represents a value associated with the total schedule cost 402A-402I. For instance, the first cost 402A is eight and the fourth cost 402D is six. The values of the total schedule costs 402A-402I may be used to characterize whether the members 113 are selfish or selfless. Selfishness may be assumed when the feasible schedule 216 that is selected or ranked higher (e.g., closer to the preference) places a higher total schedule cost on other members 113. Selflessness is assumed when the feasible schedule 216 that is selected or ranked higher (e.g., closer to the preference) places a lower total schedule cost on the other members 113. For example, the third member 113C selecting the first feasible schedule 216A may result in the third member 113C being characterized as selfish because the seventh cost 402G is one, while the fourth cost 402D is six and the first cost 402A is eight. Thus, higher costs have been placed on the second member 113B and the first member 113A by the third member 113C. Additionally, selection by the first member 113A of the first feasible schedule 216A may result in a characterization of the first member as selfless because the fourth cost 402D is six and the seventh cost 402G is one. Thus, lower costs have been placed on the second member 113B and the third member 113C.

Figure 7:
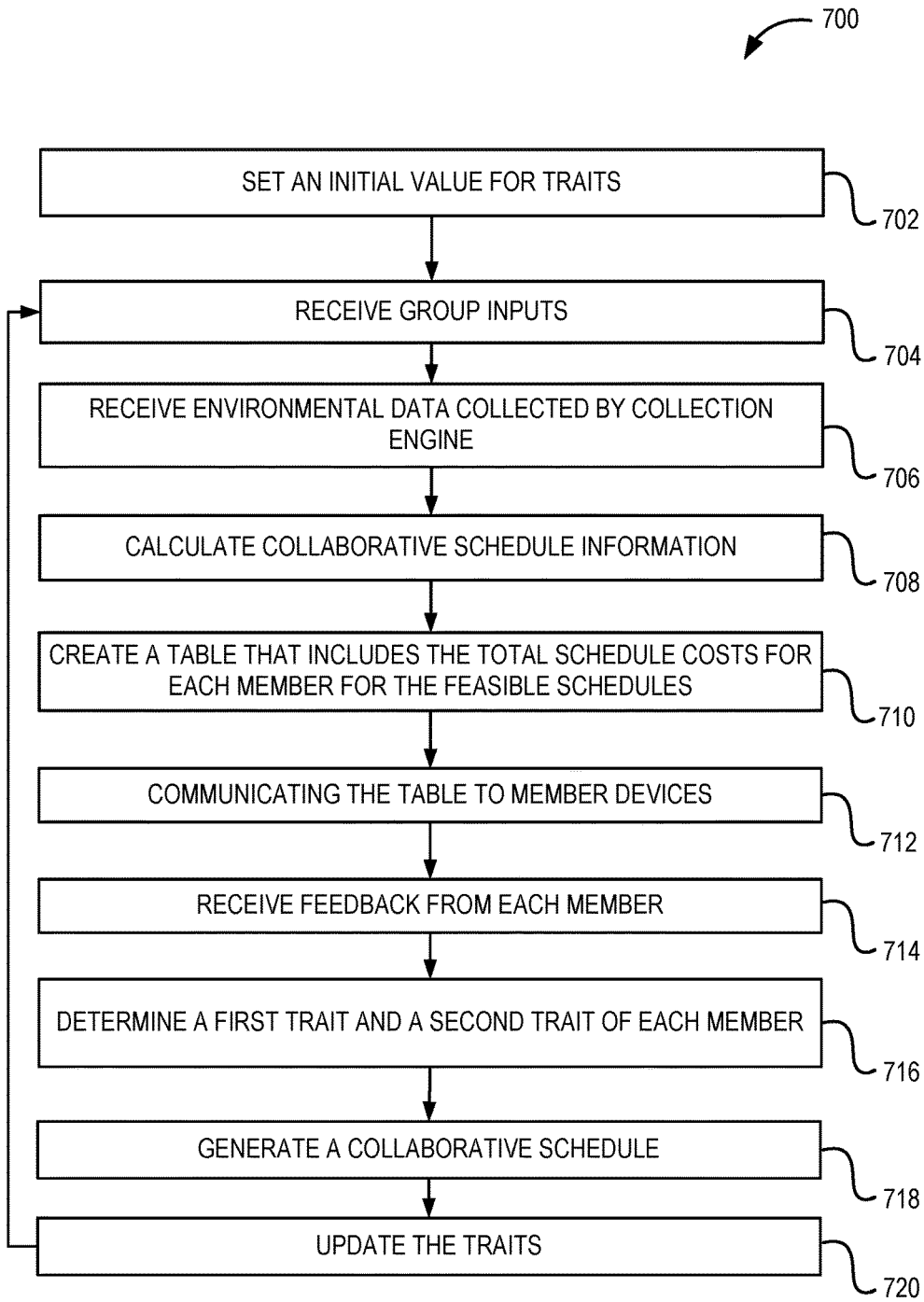
FIG. 7 is a flow diagram of an example method of collaborative scheduling.

FIG. 7 is a flow chart of an example method 700 of collaborative scheduling. The method 700 may be performed in an operating system such as the operating environment 100 of FIG. 1. The method 700 may be programmably performed in some embodiments by the calendar server 111 and/or the member device 124 described with reference to FIGS. 1-3. In some embodiments, the calendar server 111 and/or the member device 124 or another computing system may include or may be communicatively coupled to a non-transitory computer-readable medium (e.g., the memory 808 of FIG. 8) having stored thereon programming code or instructions that are executable by one or more processors (such as the processor 804 of FIG. 8) to cause a computing system and/or the calendar server 111 and/or the member device 124 to perform or control performance of the method 700. Additionally or alternatively, the calendar server 111 and/or the member device 124 may include the processor 804 described elsewhere in this disclosure that is configured to execute computer instructions to cause the calendar server 111 and/or the member device 124 or another computing system to perform or control performance of the method 700. Although illustrated as discrete blocks, various blocks in FIG. 7 may be divided into additional blocks, combined into fewer blocks, or eliminated, depending on the desired implementation.

The method 700 may begin at block 702 in which an initial value may be set for traits. The initial value may be set for each member who is included in a group to which a collaborative schedule pertains. In some embodiments, a calendar server such as the calendar server 111 of FIGS. 1 and 2 may be configured to set initial values for the members.

At block 704, group inputs may be received. The group inputs may include individual member tasks, mutual member tasks, individual member constraints, and mutual member constraints. In some embodiments, the group inputs may be received from a member device such as the member device 124 of FIGS. 1 and 2. The individual member tasks and the mutual member tasks include at least one hard task that is not subject to violation and at least one flexible task that is subject to violation. At block 706, receiving, at the calendar server, environmental data may be received. The environmental data may be collected by a collection engine.

At block 708, collaborative schedule information may be calculated. The collaborative schedule information may be calculated based on the environmental data, the traits, the group inputs, or some combination thereof. The collaborative schedule information may include a particular number of feasible schedules and total schedule costs that are associated with the feasible schedules for each member. The total schedule costs for each member may be based on an individual member performance cost, a flexible task violation cost, a behavior cost, or some combination thereof.

In some embodiments, the calculating the collaborative schedule information includes computing the total schedule cost for each member and for each of the feasible schedules. The total schedule cost for each member may be computed according to total schedule cost expressions which are described elsewhere in this paper.

At block 710, a table may be created. The table may include the total schedule costs for each of the feasible schedules for each member. At block 712, the table may be communicated to member devices associated with each member. At block 714, feedback may be received from each member. The feedback may include a selection of a feasible schedule as a preferred schedule. In some embodiments, the feedback may additionally or alternatively include a rank of each of the feasible schedules relative to one another.

In some embodiments, the feedback may include a first selection in which a first feasible schedule is selected as the preferred schedule from a first member, a second preference selecting the first feasible schedule from the second member, and the first feasible schedule having a higher total schedule cost to the first member than to a second member of the plurality of members. In these and other embodiments, in response to the above feedback, the method 700 may include characterizing the first member as selfless and characterizing the second member as selfish.

At block 716, a first trait and a second trait may be determined for each member. The first trait may include selfishness in some embodiments. The first trait may be assumed when the feasible schedule that is selected places a higher total schedule cost on other members. The second trait may include selflessness in some embodiments. The second trait may be assumed when the feasible schedule that is selected places a lower total schedule cost on the other members.

In some embodiments, the determination of the first trait and the second trait may include estimating the selflessness parameter and the selfishness parameter based at least partially on the received feedback. In these and other embodiments, the estimating may include calculating a probability of each member responding to a neutral mutual task. The calculating the probability of each member responding to the neutral mutual task may be performed according to a neutral mutual task expression, which is described elsewhere in this disclosure.

The estimating may include calculating a probability of each member responding to a constrained mutual task in a selfless manner. The calculating the probability of each member responding to the constrained mutual task in the selfless manner may be performed according to a selfless mutual task expression, which is described elsewhere in this disclosure.

The estimating may include calculating a probability of each member responding to a constrained mutual task in a selfish manner. The calculating the probability of each member responding to the constrained mutual task in the selfish manner may be performed according to a selfish mutual task expression, which is described elsewhere in this disclosure.

In some embodiments, the calculating the probability of each member responding to the constrained mutual task in the selfish manner and calculating the probability of each member responding to the constrained mutual task in the selfless manner may include plotting a histogram of similar situations and using Laplace smoothing, computing the selflessness parameter according to the selflessness expression and the selfishness expression, which are described elsewhere in this disclosure. At block 718, a collaborative schedule may be generated. The collaborative schedule may be generated as the feasible schedules selected by the members. At block 720, the traits of each member may be updated based on the received feedback. Following the update to the traits, the method 700 may proceed to one or more of blocks 704, 706, 708, 710, 712, 714, 716, 718, and 720. Operations performed in block 708 may use updated values of the traits.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments. For example, in some embodiments the method 700 may include multiple operations for calculating the collaborative schedule information. The operations may include enumerating all possible schedules that include completion of the individual member tasks and the mutual member tasks. Vectors may be defined for each of the individual member tasks and for each of the mutual member tasks. The individual member tasks and the mutual member tasks may be divided into a particular number of task groups. The task groups may have the start time or the end time within a particular time frame. For the individual member tasks and the mutual member tasks in each of the groups, one or more possibilities may be considered for unknown location parameters. Vectors that exhibit continuity in one or more unknown locations may be chosen. Unknown values for the start times or for the end times may be found that satisfy the individual member constraints and the mutual member constraints. The feasible schedules may be identified as a subset of the possible schedules that are achievable without violating the individual member constraints or the mutual member constraints.

Figure 8:
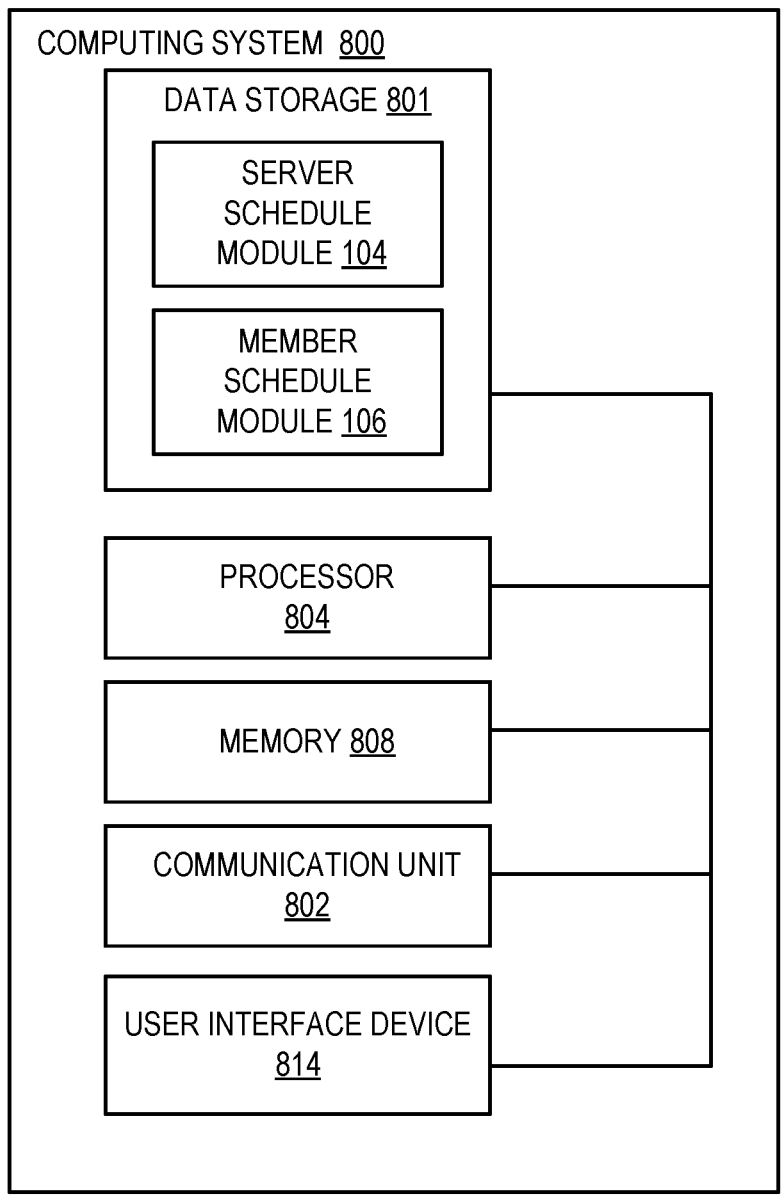
FIG. 8 illustrates an example computing system 800 configured for collaborative scheduling, all arranged in accordance with at least one embodiment described herein.

FIG. 8 illustrates an example computing system 800 configured for collaborative scheduling. The computing system 800 may be implemented in the operating environment 100 of FIG. 1, for instance. Examples of the computing system 800 may include the calendar server 111 or the member device 124. The computing system 800 may include one or more processors 804, a memory 808, a communication unit 802, the user interface device 814, and a data storage 801 that includes the server schedule module 104 and the member schedule module 106 (collectively, modules 104 and 106).

The processor 804 may include any suitable special-purpose or general-purpose computer, computing entity, or processing device including various computer hardware or software modules and may be configured to execute instructions stored on any applicable computer-readable storage media. For example, the processor 804 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 8, the processor 804 may more generally include any number of processors configured to perform individually or collectively any number of operations described in the present disclosure. Additionally, one or more of the processors 804 may be present on one or more different electronic devices or computing systems. In some embodiments, the processor 804 may interpret and/or execute program instructions and/or process data stored in the memory 808, the data storage 801, or the memory 808 and the data storage 801. In some embodiments, the processor 804 may fetch program instructions from the data storage 801 and load the program instructions in the memory 808. After the program instructions are loaded into the memory 808, the processor 804 may execute the program instructions.

The memory 808 and the data storage 801 may include computer-readable storage media for carrying or having computer-executable instructions or data structures stored thereon. Such computer-readable storage media may include any available media that may be accessed by a general-purpose or special-purpose computer, such as the processor 804. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 804 to perform a certain operation or group of operations.

The communication unit 802 may include one or more pieces of hardware configured to receive and send communications. In some embodiments, the communication unit 802 may include one or more of an antenna, a wired port, and modulation/demodulation hardware, among other communication hardware devices. In particular, the communication unit 802 may be configured to receive a communication from outside the computing system 800 and to present the communication to the processor 804 or to send a communication from the processor 804 to another device or network (e.g., 122 of FIG. 1).

The user interface device 814 may include one or more pieces of hardware configured to receive input from and/or provide output to a user. In some embodiments, the user interface device 814 may include one or more of a speaker, a microphone, a display, a keyboard, a touch screen, or a holographic projection, among other hardware devices.

The modules 104 and 106 may include program instructions stored in the data storage 801. The processor 804 may be configured to load the modules 104 and 106 into the memory 808 and execute the modules 104 and 106. Alternatively, the processor 804 may execute the modules 104 and 106 line-by-line from the data storage 801 without loading them into the memory 808. When executing the modules 104 and 106, the processor 804 may be configured to perform a participation verification process as described elsewhere in this disclosure.

Modifications, additions, or omissions may be made to the computing system 800 without departing from the scope of the present disclosure. For example, in some embodiments, the computing system 800 may not include the user interface device 814. In some embodiments, the different components of the computing system 800 may be physically separate and may be communicatively coupled via any suitable mechanism. For example, the data storage 801 may be part of a storage device that is separate from a server, which includes the processor 804, the memory 808, and the communication unit 802, that is communicatively coupled to the storage device.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, or any other non-transitory storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module," "component," and/or "engine" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

What is claimed is:

1. A method of collaborative scheduling, the method comprising:
    setting, by a calendar server, an initial value for at least one of a selflessness trait or a selfishness trait of each member of a plurality of members who are included in a group to which a collaborative schedule pertains, the at least one of the selflessness trait or the selfishness trait related to behavior of a given member as indicated by preferences of the given member;
    receiving, at the calendar server, group inputs that include individual member tasks, mutual member tasks, individual member constraints, and mutual member constraints;
    receiving, at the calendar server, environmental data collected by a data collection engine;
    calculating, by the calendar server, first collaborative schedule information based on the environmental data, the initial value for the at least one of the selflessness trait and the selfishness trait, and the group inputs, the first collaborative schedule information including a number of first feasible schedules for a first task, event, or responsibility and total schedule costs that are associated with the first feasible schedules for each member, the total schedule costs for each member being based on an individual member performance cost, a flexible task violation cost, and a behavior cost, the behavior cost being based on the initial value for the at least one of the selflessness trait and the selfishness trait;
    receiving, by the calendar server, feedback from each member, the feedback including a selection of a feasible schedule of the first feasible schedules as a preferred schedule;
    determining, by the calendar server, an updated value for the at least one of the selflessness trait and the selfishness trait of each member, the selfishness trait being assumed when the feasible schedule that is selected by the member places a higher total schedule cost on other members of the plurality of members, and the selflessness trait being assumed when the feasible schedule that is selected by the member places a lower total schedule cost on the other members;
    generating, by the calendar server, a collaborative schedule based on the feasible schedules selected by the plurality of members;
    storing, by the calendar server, the updated value for the at least one of the selflessness trait and the selfishness trait of each member based on the received feedback; and
    calculating, by the calendar server, second collaborative schedule information based on the updated value for at least one of the selflessness trait and the selfishness trait of at least one member, the second collaborative schedule information including second feasible schedules for a second task, event, or responsibility.

2. The method of claim 1, wherein:
    the calculating the first collaborative schedule information includes computing the total schedule cost for each member and for each of the feasible schedules, and
    the total schedule cost for each member is computed according to total schedule cost expressions:

$$C_t(S_i,u_j)=C_1(S_i,u_j)-C_2(S_i,u_j),$$

$$C_1(S_i,u_j)=C_p(S_i,u_j)-\gamma C_v(S_i,u_j); \text{ and}$$

$$C_2(S_i,u_j)=\Sigma_k \alpha_{(j,k)} \max[C_1(S_i,u_j)-C_1(S_i,u_k),0]+\Sigma_k \beta_{(j,k)} \max[C_1(S_i,u_k)-C_1(S_i,u_j),0];$$

in which:
    i, j, and k represent indexing variables;
    $S_i$ represents one of the feasible schedules identified by an indexing variable;
    $u_j$ represents one of the members identified by another indexing variable;
    $C_t(S_i,u_j)$ represents a total schedule cost for one of the members and for one of the feasible schedules;
    $C_1(S_i,u_j)$ represents individual costs incurred by one of the members and for one of the feasible schedules;
    $C_2(S_i,u_j)$ represents behavioral costs incurred by one of the members and for one of the feasible schedules;
    $C_p(S_i,u_j)$ represents an individual member performance cost of one of the feasible schedules for one of the members;
    $C_v(S_i,u_j)$ represents a flexible task violation cost while performing one of the feasible schedules for one of the members;
    γ represents a penalty factor which decreases the individual costs if any feasible tasks are violated;
    max represents a maximizing function;
    $\alpha_{(j,k)}$ represents a selflessness parameter that is independent of the feasible schedule;
    $\beta_{(j,k)}$ represents a selfishness parameter that is independent of the feasible schedule;
    $\Sigma_k \alpha_{(j,k)} \max[C_1(S_i,u_j)-C_1(S_i,u_k), 0]$ represents selflessness expression; and
    $\Sigma_k \beta_{(j,k)} \max[C_1(S_i,u_k)-C_1(S_i,u_j), 0]$ represents selfishness expression.

3. The method of claim 2, wherein:
    the determining the updated value for the at least one of the selflessness trait and the selfishness trait includes estimating a selflessness parameter and a selfishness parameter based on the received feedback; and
    the estimating includes:
        calculating a probability of each member responding to a neutral mutual task;
        calculating a probability of each member responding to a constrained mutual task in a selfless manner; and
        calculating a probability of each member responding to a constrained mutual task in a selfish manner.

4. The method of claim 3, wherein:
the calculating the probability of each member responding to the neutral mutual task is performed according to a neutral mutual task expression:

$$P_i^n = \frac{\mu_i}{N},$$

the calculating the probability of each member responding to the constrained mutual task in the selfless manner is performed according to a selfless mutual task expression:

$$P_i^{sl} = \frac{\sigma_i}{Q},$$

the calculating the probability of each member responding to the constrained mutual task in the selfish manner is performed according to a selfish mutual task expression:

$$P_i^s = \frac{T_i}{Q},$$

in which:
N represents a total number of neutral mutual tasks;
Q represents a total number of constrained mutual tasks;
$T_i$ represents a number of times a member responded to a selfish mutual task;
$\sigma_i$ represents a number of times a member responded to a selfless mutual task;
$P_i^n$ represents the probability of each member responding to the neutral mutual task;
$P_i^{sl}$ represents the probability of each member responding to the constrained mutual task in a selfless manner;
$P_i^s$ represents the probability of each member responding to the constrained mutual task in a selfish manner; and
$\mu_i$ represents a number of times a member responded to a neutral mutual task.

5. The method of claim 4, wherein the calculating the probability of each member responding to the constrained mutual task in the selfish manner and calculating the probability of each member responding to the constrained mutual task in the selfless manner includes:
plotting a histogram of similar situations; and
using Laplace smoothing, computing the selflessness parameter according to a selflessness expression:

$$\alpha_{(i,j)} = (\sigma_i + 1)/(N+s);$$

$$\beta_{(i,j)} = (T_i + 1)/(N+s); \text{ and}$$

$$s = t \text{ COMB } x; \text{ in which:}$$

s is a total number of assumable combinations in the constrained task;
t represents the traits;
x represents a number of members in the plurality of members; and
COMB represents a combination operator.

6. The method of claim 1, further comprising:
creating a table that includes the total schedule costs for each of the feasible schedules for each member; and
communicating the table to member devices associated with each member.

7. The method of claim 1, wherein:
the feedback includes a first selection in which a first feasible schedule is selected as the preferred schedule from a first member of the plurality of members, a second preference selecting the first feasible schedule from a second member, and the first feasible schedule having a higher total schedule cost to the first member than to the second member of the plurality of members; and
the method further comprises:
in response to a first preference, characterizing the first member as selfless; and
in response to the second preference, characterizing the second member as selfish.

8. The method of claim 1, wherein the feedback includes a rank of each of the feasible schedules relative to one another.

9. The method of claim 1, wherein the calculating the first collaborative schedule information includes:
enumerating all possible schedules that include completion of the individual member tasks and the mutual member tasks;
defining a vector for each of the individual member tasks and for each of the mutual member tasks, the vectors formatted as:
[start time, end time, start location, end location];
dividing the individual member tasks and the mutual member tasks into a particular number of task groups, wherein each of the task groups have the start time or the end time within a particular time frame;
for the individual member tasks and the mutual member tasks in each of the task groups, considering one or more possibilities for unknown location parameters;
choosing vectors that exhibit continuity in one or more unknown locations;
finding unknown values for the start times or for the end times that satisfy the individual member constraints and the mutual member constraints; and
identifying the feasible schedules as a subset of the possible schedules that are achievable without violating the individual member constraints or mutual member constraints.

10. The method of claim 1, wherein the individual member tasks and the mutual member tasks include at least one hard task that is characterized as not being subject to violation and at least one flexible task that is characterized as subject to violation.

11. A non-transitory computer-readable medium having encoded therein programming code executable by a processor to perform or control performance of operations comprising:
setting, by a calendar server, an initial value for at least one of a selflessness trait rL a selfishness trait of each member of a plurality of members who are included in a group to which a collaborative schedule pertains, the at least one of the selflessness trait or the selfishness trait related to behavior of a given member as indicated by preferences of the given member;
receiving, at the calendar server, group inputs that include individual member tasks, mutual member tasks, individual member constraints, and mutual member constraints;

receiving, at the calendar server, environmental data collected by a data collection engine;

calculating, by the calendar server, first collaborative schedule information based on the environmental data, the initial value for the at least one of the selflessness trait and the selfishness trait, and the group inputs, the first collaborative schedule information including a number of first feasible schedules for a first task, event, or responsibility and total schedule costs that are associated with the first feasible schedules for each member, the total schedule costs for each member being based on an individual member performance cost, a flexible task violation cost, and a behavior cost, the behavior cost being based on the initial value for the at least one of the selflessness trait and the selfishness trait;

receiving, by the calendar server, feedback from each member, the feedback including a selection of a feasible schedule of the first feasible schedules as a preferred schedule;

determining, by the calendar server, an updated value for the at least one of the selflessness trait and the selfishness trait of each member, the selfishness trait being assumed when the feasible schedule that is selected by the member places a higher total schedule cost on other members of the plurality of members, and the selflessness trait being assumed when the feasible schedule that is selected by the member places a lower total schedule cost on the other members;

generating, by the calendar server, a collaborative schedule based on the feasible schedules selected by the plurality of members;

storing, by the calendar server, the updated value for the at least one of the selflessness trait and the selfishness trait of each member based on the received feedback; and calculating, by the calendar server, second collaborative schedule information based on the updated value for at least one of the selflessness trait and the selfishness trait of at least one member, the second collaborative schedule information including second feasible schedules for a second task, event, or responsibility.

12. The non-transitory computer-readable medium of claim 11, wherein:

the calculating the collaborative schedule information includes computing the total schedule cost for each member and for each of the feasible schedules, and the total schedule cost for each member is computed according to total schedule cost expressions:

$$C_t(S_i,u_j)=C_1(S_i,u_j)-C_2(S_i,u_j),$$

$$C_1(S_i,u_j)=C_p(S_i,u_j)-\gamma C_v(S_i,u_j); \text{ and}$$

$$C_2(S_i,u_j)=\Sigma_k\alpha_{(j,k)}\max[C_1(S_i,u_j)-C_1(S_i,u_k),0]+\Sigma_k\beta_{(j,k)}\max[C_1(S_i,u_k)-C_1(S_i,u_j),0];$$

in which:
i, j, and k represent indexing variables;
$S_i$ represents one of the feasible schedules identified by an indexing variable;
$u_j$ represents one of the members identified by another indexing variable;
$C_t(S_i,u_j)$ represents a total schedule cost for one of the members and for one of the feasible schedules;
$C_1(S_i,u_j)$ represents individual costs incurred by one of the members and for one of the feasible schedules;
$C_2(S_i,u_j)$ represents behavioral costs incurred by one of the members and for one of the feasible schedules;
$C_p(S_i,u_j)$ represents an individual member performance cost of one of the feasible schedules for one of the members;
$C_v(S_i,u_j)$ represents a flexible task violation cost while performing one of the feasible schedules for one of the members;
$\gamma$ represents a penalty factor which decreases the individual costs if any feasible tasks are violated;
max represents a maximizing function;
$\alpha_{(j,k)}$ represents a selflessness parameter that is independent of the feasible schedule;
$\beta_{(j,k)}$ represents a selfishness parameter that is independent of the feasible schedule;
$\Sigma_k\alpha_{(j,k)}\max[C_1(S_i,u_j)-C_1(S_i,u_k),0]$ represents selflessness expression; and
$\Sigma_k\beta_{(j,k)}\max[C_1(S_i,u_k)-C_1(S_i,u_j),0]$ represents selfishness expression.

13. The non-transitory computer-readable medium of claim 12, wherein:

the determining the updated value for the at least one of the selflessness trait and the selfishness trait includes estimating a selflessness parameter and a selfishness parameter based on the received feedback; and the estimating includes:
calculating a probability of each member responding to a neutral mutual task;
calculating a probability of each member responding to a constrained mutual task in a selfless manner; and
calculating a probability of each member responding to a constrained mutual task in a selfish manner.

14. The non-transitory computer-readable medium of claim 13, wherein:

the calculating the probability of each member responding to the neutral mutual task is performed according to a neutral mutual task expression:

$$P_i^n = \frac{\mu_i}{N},$$

the calculating the probability of each member responding to the constrained mutual task in the selfless manner is performed according to a selfless mutual task expression:

$$P_i^{sl} = \frac{\sigma_i}{Q},$$

the calculating the probability of each member responding to the constrained mutual task in the selfish manner is performed according to a selfish mutual task expression:

$$P_i^s = \frac{T_i}{Q},$$

in which:
N represents a total number of neutral mutual tasks;
Q represents a total number of constrained mutual tasks;

$T_i$ represents a number of times a member responded to a selfish mutual task;

$\sigma_i$ represents a number of times a member responded to a selfless mutual task;

$P_i^n$ represents the probability of each member responding to the neutral mutual task;

$P_i^{sl}$ represents the probability of each member responding to the constrained mutual task in a selfless manner;

$P_i^s$ represents the probability of each member responding to the constrained mutual task in a selfish manner; and $\mu_i$ represents a number of times a member responded to a neutral mutual task.

15. The non-transitory computer-readable medium of claim 14, wherein the calculating the probability of each member responding to the constrained mutual task in the selfish manner and calculating the probability of each member responding to the constrained mutual task in the selfless manner includes:

plotting a histogram of similar situations; and using Laplace smoothing, computing the selflessness parameter according to a selflessness expression:

$$\alpha_{(i,j)}=(\sigma_i+1)/(N+s);$$

$$\beta_{(i,j)}=(T_i+1)/(N+s); \text{ and}$$

$$s=t \text{ COMB } x; \text{ in which:}$$

s is a total number of assumable combinations in the constrained task;

t represents the traits;

x represents a number of members in the plurality of members; and

COMB represents a combination operator.

16. The non-transitory computer-readable medium of claim 11, wherein the operations further comprise:

creating a table that includes the total schedule costs for each of the feasible schedules for each member; and communicating the table to member devices associated with each member.

17. The non-transitory computer-readable medium of claim 11, wherein:

the feedback includes a first selection in which a first feasible schedule is selected as the preferred schedule from a first member of the plurality of members, a second preference selecting the first feasible schedule from a second member, and the first feasible schedule having a higher total schedule cost to the first member than to the second member of the plurality of members; and the operations further comprise:

in response to the first preference, characterizing the first member as selfless; and in response to the second preference, characterizing the second member as selfish.

18. The non-transitory computer-readable medium of claim 11, wherein the feedback includes a rank of each of the feasible schedules relative to one another.

19. The non-transitory computer-readable medium of claim 11, wherein the calculating the collaborative schedule information includes:

enumerating all possible schedules that include completion of the individual member tasks and the mutual member tasks;

defining a vector for each of the individual member tasks and for each of the mutual member tasks, the vectors formatted as:

[start time, end time, start location, end location];

dividing the individual member tasks and the mutual member tasks into a particular number of task groups, wherein each of the task groups have the start time or the end time within a particular time frame;

for the individual member tasks and the mutual member tasks in each of the task groups, considering one or more possibilities for unknown location parameters;

choosing vectors that exhibit continuity in one or more unknown locations;

finding unknown values for the start times or for the end times that satisfy the individual member constraints and the mutual member constraints; and identifying the feasible schedules as a subset of the possible schedules that are achievable without violating the individual member constraints or mutual member constraints.

20. The non-transitory computer-readable medium of claim 11, wherein the individual member tasks and the mutual member tasks include at least one hard task that is characterized as not being subject to violation and at least one flexible task that is characterized as subject to violation.

* * * * *